July 23, 1929.  W. H. PRATT  1,722,157
INDUCTION METER
Filed June 29, 1926
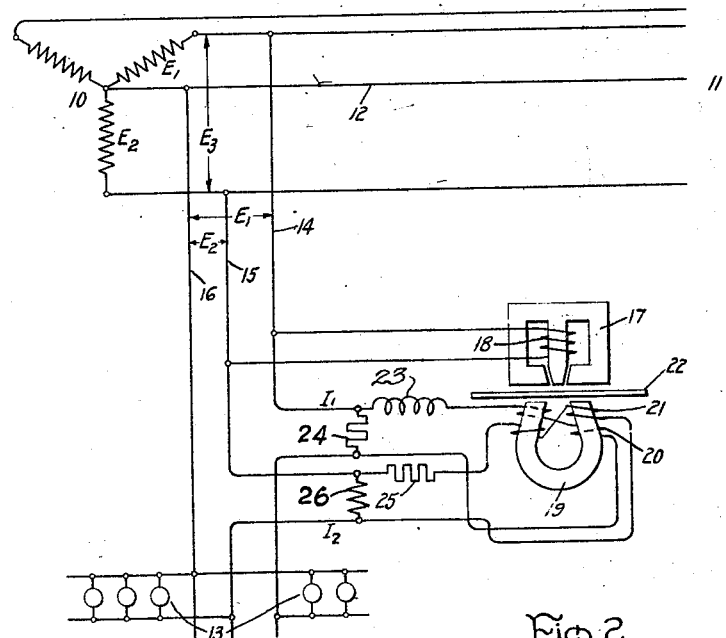
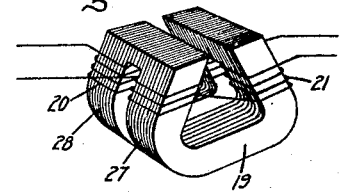
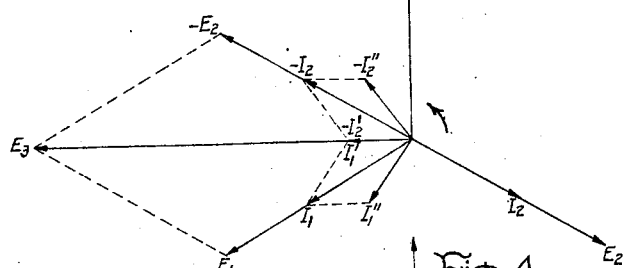
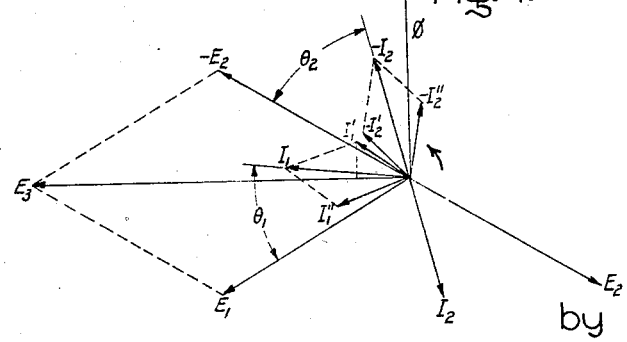
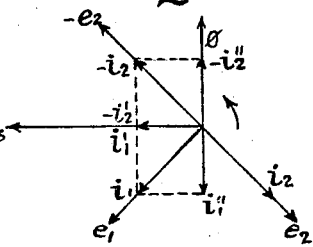
Inventor:
William H. Pratt,
by
His Attorney.

Patented July 23, 1929.

1,722,157

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

INDUCTION METER.

Application filed June 29, 1926. Serial No. 119,450.

My invention relates to induction meters and instruments, and in particular to polyphase induction meters having a simplicity and low cost approaching that of the ordinary single-torque element induction meter.

The features of my invention which are believed to be novel and patentable will be pointed out in the claims appended hereto. For a better understanding of my invention, reference is made in the following description to a specific embodiment and application of my invention represented in the drawing where I have shown in Fig. 1 the circuit connections and general arrangement of the meter parts as applied to measure the energy of a two-phase, three-wire distribution system; Fig. 2 represents a preferred arrangement of the double-coil current electromagnet diagrammatically represented in Fig. 1; Figs. 3 and 4 represent vector diagrams for the meter of Fig. 1 under different power factor conditions; and Fig. 5 represents the vector diagram of a meter adapted for a three-wire, quarter-phase system.

Referring to Fig. 1, 10 represents a three-phase, Y-connected source of supply, such as the secondary of a distribution transformer, supplying a distribution system 11 which includes a neutral wire 12 connected to the neutral point of the source 10. With such arrangement it is possible to supply two-phase, three-wire feeder circuits such as is represented for supplying the load indicated at 13. If the Y voltage $E_3$ across feeders 14 and 15 is 208 volts, the voltage $E_1$ and $E_2$ from either of wires 14 or 15 to the feeder 16 connected to the neutral point will be 120 volts. Heretofore such feeder circuits have been metered by the ordinary polyphase meter having two separate meter torque elements, each having a potential electromagnet and a current electromagnet. By means of my invention this two-phase circuit may be metered by a single meter torque element having two-current coils and a single potential coil.

The potential electromagnet indicated at 17 has its single coil 18 connected across lines 14 and 15, and will thus be supplied at the voltage $E_3$. The current electromagnet is indicated at 19 and is provided with two coils, a coil 20 supplied either directly or through a current transformer with current proportional to that flowing in feeder 14, and a coil 21, supplied either directly or through a current transformer with current proportional to that flowing in feeder 15. Each of the coils 20 and 21 is divided into sections and wound on the two main legs of the core. It is seen that no connection between the feeder 16 and the meter is required, so that it is unnecessary to bring this feeder in proximity to the meter. This is a distinct advantage where house wiring is changed over from single-phase to the two-phase, three-wire arrangement here indicated.

It will be evident that the currents flowing in feeders 14 and 15 will be 120 degrees out of phase and may be unbalanced. Means are provided for bringing the current in coils 20 and 21 into the proper phase relation with each other and with the phase relation of the emf applied to the meter, so that the meter fluxes acting upon the rotatable armature of conducting material indicated at 22 will produce torque thereon proportional to the energy supplied to the load 13. It is apparent that if coils 20 and 21 are wound in reverse relation with respect to their circuit connections, as indicated in Fig. 1, the resultant phase angle difference between their fluxes will be 60 degrees instead of 120 degrees. The difference of 60 degrees is eliminated by retarding the phase angle of the current in coil 20 and advancing the phase angle of the current in coil 21 with respect to their respective line currents, so that their resultant fluxes are in phase. This may be accomplished by placing the proper amount of resistance and reactance in shunt and series relation with these coils. Thus, coil 20 has a reactance 23 in series and a resistance 24 in shunt, so that the phase angle of the current in this coil itself will be retarded with respect to the current in feeder 14. Coil 21 has a resistance 25 in series and a reactance 26 in shunt, so that the phase angle of the current in this coil will be advanced with respect to that in feeder 15.

Fig. 3 shows the vector diagram of the meter and associated circuits at unity power factor. $E_1$ and $E_2$ represent the two voltages between the neutral wire 16 and the feeders 14 and 15, respectively, and $E_3$ the vector difference of $E_1$ and $E_2$ which is the voltage across feeders 14 and 15 applied to the potential coil of the meter. $I_1$ and $I_2$ represent the current in feeders 14 and 15, respectively. $I_2$ reversed is represented as $-I_2$. $I_1''$ is the current in the shunt resistance 24, and $-I_2''$ the current in the shunt reactance 26. The currents in coils 20 and 21 are respectively represented by vectors $I_1'$ and $-I_2'$ which are in phase with each other and with the voltage $E_3$.

As usual, the current in the potential coil is caused to lag 90 degrees behind the impressed voltage and the flux produced thereby may, therefore, be represented by the vector $\phi$. The fluxes produced by coils 20 and 21 will be in phase with the currents $I_1'$ and $-I_2'$. The relation of current and potential fluxes at unity power factor is, therefore, 90 degrees, which is the usual relation for producing torque in this type of meter.

It will be apparent from this vector diagram that the currents $I_1$ and $I_2$ might be made unequal, or one of them might become zero, without altering the correctness of the principle used, since the angle between $I_1$ and $I_1'$ and between $I_2$ and $I_2'$ will always be 30 degrees in this particular circuit.

The vector diagram of Fig. 3 assumes the power factor of both phases of the circuit to be unity. Fig. 4 shows a vector diagram in which it is assumed that the power factor of the two phases are both less than unity and unequal. Thus, $I_1$ lags 37 degrees, or angle $\Theta_1$, behind voltage $E_1$ corresponding to .8 power factor, and $I_2$ lags 45 degrees, or angle $\Theta_2$, behind $E_2$, corresponding to .7 power factor.

It will be apparent that no error whatever is introduced by changing the power factor if the power factors of both phases are maintained the same, as will ordinarily be the case. The rather extreme case represented in the vector diagram of Fig. 4 is taken to show that even where the power factors are unequal to the extent indicated, the error is very small. Thus, the vector sum of $I_1'$ and $I_2'$ of Fig. 4 will be nearly the same as it would be if these vectors coincided. The power measured by the meter will be $$(E_3 I_1' \cos \Theta_1 + E_3 I_2' \cos \Theta_2)$$

multiplied by the constant of the meter. The total watts of the two phases are equal to $$E_1 \times \sqrt{3} \times \frac{I_1}{\sqrt{3}} \cos \Theta_1 + E_2 \times \sqrt{3} \times \frac{I_2}{\sqrt{3}} \cos \Theta_2 = E_1 I_1 \cos \Theta_1 + E_2 I_2 \cos \Theta_2.$$

Voltages $E_1$ and $E_2$ are equal to each other and proportional to $E_3$, and $I_1$ and $I_2$ are proportional to $I_1'$ and $I_2'$ respectively, so that the meter will measure the two-phase energy within commercial limits of accuracy in most installations such as is here represented.

Due to the fact that the currents in coils 20 and 21 may vary with respect to each other as the load distribution changes, it is desirable that they be arranged so that there will be no mutual induction between them, as otherwise the proper distribution of current between the coils themselves and the circuits in shunt thereto might be interfered with. To prevent the latter, the coils 20 and 21 are made mutually non-inductive. A preferred way of doing this is represented in Fig. 2, where 19 represents the core of the current electromagnet more or less diagrammatically represented in Fig. 1. This core is made of laminated iron and is magnetically divided, except at the pole faces, into two sections 27 and 28. The two parts of coil 20 are wound on section 28, and the two parts of coil 21 are wound on section 27. This arrangement makes coils 20 and 21 mutually non-inductive, without interfering with the joint action of their torque-producing fluxes. The joining of the two sections at the pole faces is not essential so far as making the two coils mutually non-inductive is concerned, but it gives a somewhat better flux distribution on the armature 22 than entirely separate magnetic sections would give. The total width of the core 19 at the pole faces is made about the same as the width of the adjacent pole faces of the potential core 17. The necessary resistances and reactances 23 to 26 will preferably be contained within the meter case.

The invention is generally applicable to induction torque elements for either the indicating or integrating type meter, and to induction power relays and the like, and when I specify meters I intend to include any such device to which the invention is applicable. It is also applicable to other phase relations than are here represented; for example, to quarter-phase, three-wire distribution systems, in which case it would be necessary to shift the phase angle of the currents in coils 20 and 21 45 degrees toward each other, as represented in Fig. 5 where small letters have been used to designate vectors corresponding to those designated in Fig. 3 with capital letters.

In accordance with the provisions of the patent statutes, I have described the principle of operation of my invention, together with the apparatus which I now consider to represent the best embodiment thereof, but I desire to have it understood that the apparatus shown and described is only illustrative, and that the invention may be carried out by other means.

What I claim as new, and desire to secure by Letters Patent of the United States, is:

1. An induction type meter comprising a rotatably mounted armature of conducting material, a potential electromagnet and a current electromagnet, said electromagnets cooperating together to produce the torque fluxes of said meter, one of said electromagnets comprising parallel magnetic circuits having common pole faces and separate energizing windings on the parallel magnetic circuits.

2. An induction type meter comprising a rotatably mounted armature of conducting material, potential and current electromagnets cooperating with said armature to produce torque thereon by the joint action of their fluxes, an energizing winding on said potential electromagnet adapted to be energized in proportion to the voltage across two phases of a polyphase circuit, said current electromagnet comprising a pair of parallel magnetic sections having common pole faces and separate windings on said parallel sections adapted to be energized in proportion to currents flowing in different phases of said circuit.

3. In combination with a two-phase, three-wire circuit, an induction type meter unit for measuring the energy of said circuit comprising a rotatably mounted armature of conducting material, a potential electromagnet and a current electromagnet, said electromagnets producing a torque on said armature by the joint action of their fluxes, said potential electromagnet having a single energizing winding excited in proportion to the voltage across two of the phases of said circuit, said current electromagnet having a plurality of parallel magnetic sections joined at their ends by common pole faces and energizing windings on the respective sections excited in proportion to the currents flowing in the respective phases of said circuit, said current windings being connected with the various phases of said circuit in such relative directions as to produce the least phase difference in the current fluxes produced thereby, and means associated with said circuit connections for eliminating any remaining difference in the phase relations of said fluxes.

4. In combination with a two-phase, three-wire feeder circuit supplied from the neutral point and two Y points of a Y-connected, balanced voltage, three-phase source of supply, an induction watt meter for measuring the energy of said two-phase, three-wire feeder circuit comprising a rotatably mounted armature of conducting material, a potential electromagnet supplied from the said two Y points of said source and a current electromagnet comprising a pair of parallel magnetic sections joined at their ends in common pole faces, a pair of mutually non-inductive windings wound on the parallel magnetic sections supplied in reverse relation by current derived from and proportional to that flowing in the two feeders connected to said two Y points, means for advancing the phase angle of the current supplied to one of said windings by thirty degrees, and means for retarding the phase angle of the current supplied to said other current winding by thirty degrees.

5. In an induction type meter, an electromagnet therefor having a plurality of parallel magnetic sections joined at their ends with pole faces and energizing windings on the several sections for producing a torque flux for the meter.

6. In a meter, an electromagnet having a pair of parallel magnetic sections having common pole faces, separate coils on said parallel magnetic sections respectively energized by and in proportion to currents flowing in different phases of a two-phase, three-wire circuit, a resistance in shunt and a reactance in series with one of said coils for retarding the phase of its current with respect to the line current, and a reactance in shunt and a resistance in series with the other winding for advancing the phase of its current with respect to the line current, said resistances and reactances being adjusted to cause the currents in said windings to be in phase with each other at unity power factor.

7. In an induction type meter, a current electromagnet therefor comprising a U-shaped magnetic structure made up of a number of parallel U-shaped sections united at their ends so as to have common pole faces at the two ends of the U, energizing windings on said sections adapted to be energized from separate phases of a two-phase, three-wire circuit, said windings being energized in such relative directions as to produce the least phase difference between their fluxes and resistances and reactances connected in series and in shunt to said windings to eliminate any remaining difference in the phase relation of their fluxes.

In witness whereof, I have hereunto set my hand this 26th day of June, 1926.

WILLIAM H. PRATT.